No. 616,115. Patented Dec. 20, 1898.
W. A. KILMER.
WIRE FENCE MACHINE.
(Application filed Jan. 17, 1898.)

(No Model.) 6 Sheets—Sheet 1.

Fig. 1.

Witnesses:
J. A. Carter
Herbert Cowell

Inventor:
William A. Kilmer By
Thos. H. Hutchins atty

No. 616,115.　　　　　　　　　　　　　　　Patented Dec. 20, 1898.
W. A. KILMER.
WIRE FENCE MACHINE.
(Application filed Jan. 17, 1898.)

(No Model.)　　　　　　　　　　　　　　　6 Sheets—Sheet 2.

Witnesses:
J. A. Carter.
Herbert Cowell.

Inventor:
William A. Kilmer By
Thos H Hutchins atty

No. 616,115. Patented Dec. 20, 1898.
W. A. KILMER.
WIRE FENCE MACHINE.
(Application filed Jan. 17, 1898.)
(No Model.) 6 Sheets—Sheet 3.

Witnesses: Inventor:
William A Kilmer By
Thos H Hutchins atty

No. 616,115. Patented Dec. 20, 1898.
W. A. KILMER.
WIRE FENCE MACHINE.
(Application filed Jan. 17, 1898.)

(No Model.) 6 Sheets—Sheet 4.

Witnesses:
J. A. Carter
Herbert Cowell

Inventor
William A. Kilmer By
Thos. H. Hutchins atty

No. 616,115. Patented Dec. 20, 1898.
W. A. KILMER.
WIRE FENCE MACHINE.
(Application filed Jan. 17, 1898.)
(No Model.) 6 Sheets—Sheet 5.

Witnesses:
J. A. Carter.
Herbert Cowell.

Inventor:
William A Kilmer By
Thos H Hutchins atty

United States Patent Office.

WILLIAM A. KILMER, OF JOLIET, ILLINOIS.

WIRE-FENCE MACHINE.

SPECIFICATION forming part of Letters Patent No. 616,115, dated December 20, 1898.

Application filed January 17, 1898. Serial No. 666,921. (No model.)

*To all whom it may concern:*

Be it known that I, WILLIAM A. KILMER, a citizen of the United States of America, residing at Joliet, in the county of Will and State of Illinois, have invented certain new and useful Improvements in Wire-Fence Machines, of which the following is a specification.

This invention relates to certain improvements in machines for making wire fence of the kind wherein the horizontal strands are composed of two wires and the vertical portions are composed of single wires forming pickets, which are crimped at their point of intersection with the horizontal wires and placed between them and retained in their proper position by means of twisting the horizontal strands together in opposite alternate directions between the pickets, which improvements are fully set forth and explained in the following specification and claims, reference being had to the accompanying drawings, and the letters and figures of reference thereon, forming a part of this specification, in which—

This invention consists principally in certain improvements on the machine for making wire fence for which Letters Patent No. 595,392, dated December 14, 1897, were granted to me.

Figure 2:
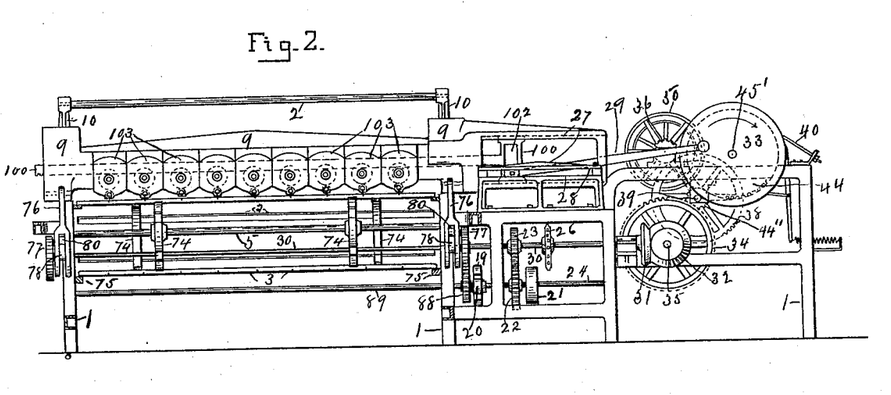
Fig. 2 is a vertical longitudinal view of Fig. 1, taken on line 1, looking in the direction of the arrow.
Figure 3:
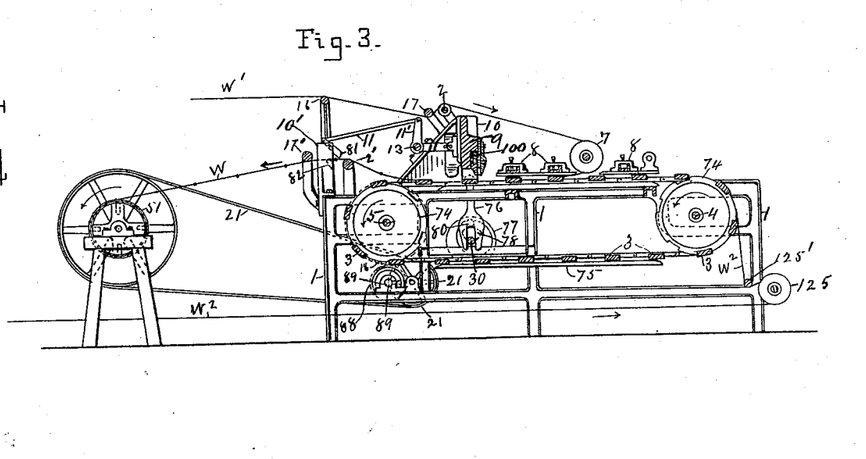
Fig. 3 is a vertical cross-section of Fig. 1, taken on line 2, looking in the direction of the arrow.
Figure 4:
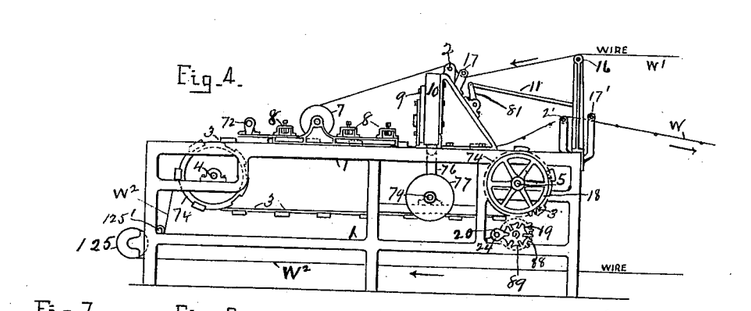
Fig. 4 is a side elevation of the machine, taken on line 3 of Fig. 1, looking in the direction of the arrow, omitting the reel carrying the finished fence.
Figure 5:
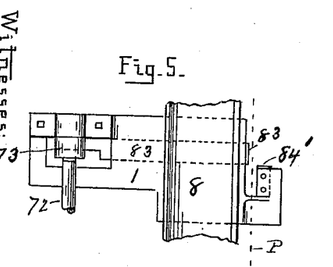
Fig. 5 is a detail top plan view of the wire-picket cutter for cutting the wire pickets off in proper lengths.
Figure 6:
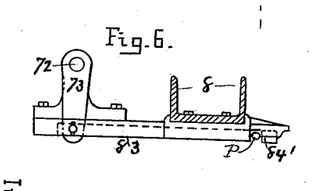
Fig. 6 is a side elevation of said picket-cutter.
Figure 11:
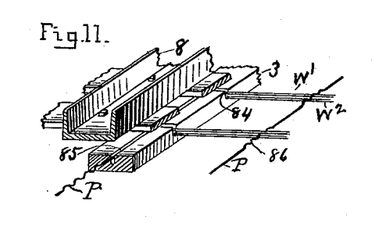
Fig. 11 is a detail perspective view showing a portion of one of said grooved cross-bars carrying in its longitudinal groove a wire picket and in its cross-grooves the strand-wires and showing a frame located above said cross-bars for holding said strand-wires and picket in their proper grooves or channels.
Figures 19, 20, 21, 22, 23, 24, 25, 26, 27:
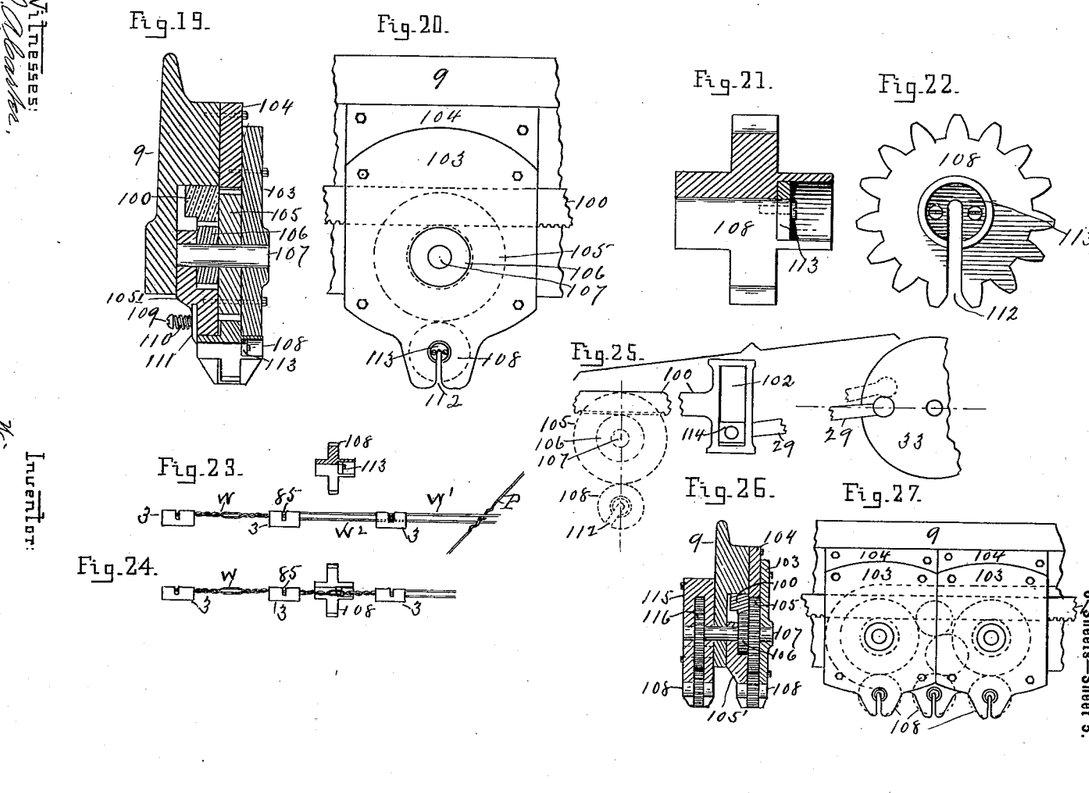
Fig. 19 is a vertical cross-section of the vertically-reciprocating cross-head carrying the strand-wire twisters and showing a vertical section taken through the center of one of the strand-wire twisters and of the gears and pinion and a cross-section of the toothed rack for operating said twister.
Fig. 20 is a side view of a portion of said vertically-reciprocating cross-head, showing a side view of one of the face-plates for holding in place the strand-wire twister and the gear-and-pinion and rack mechanism shown in broken lines.
Fig. 21 is a central vertical section of one of the strand-wire twisters.
Fig. 22 is an end view of one of said strand-wire twisters.
Fig. 23 is a detail view showing a series of the channeled or grooved cross-bars of the endless traveling bed and showing the strand-wires and pickets in their respective grooves of said cross-bars and showing one of the strand-wire twisters as it would appear ready to descend upon the strand-wires and fork over them between the grooved cross-bars to twist them together, as shown at the left in said figure.
Fig. 24 is a similar view to Fig. 23, showing said twister as it would appear forked over and in contact with said strand-wires ready to twist them together, as shown in said Fig. 23.
Fig. 25 is a detail view showing a portion of the rack-bar for driving the twister-pinions and showing a portion of its pitman and crank and showing in broken lines the movement of said crank in order to turn the twister-pinions backward a trifle to release them from the strand-wires after being twisted together.
Fig. 26 is a similar view to Fig. 19 and showing in addition thereto an auxiliary twister-pinion arranged on the opposite side of said vertically-reciprocating cross-head and between the twisters on its forward side.
Fig. 27 is a similar view to Fig. 20, showing in addition thereto the twister-pinion in broken lines on its rear side between the twister-pinions on its forward side.

Referring to the drawings, 1 represents the main frame of the machine. The main portion of the machine (shown at the left in Fig. 1) is provided with an endless traveling bed 3, mounted on the wheels 74 74, secured, respectively, on the cross-shafts 4 and 5, as shown more particularly in Figs. 3 and 4. The cross-bars of said traveling bed are each provided on their upper side with a central longitudinal groove 85 for receiving the wire pickets as they are fed into the machine and also cross-grooves 84, for carrying the two strand-wires W' and W², one above the other, the cross-grooves corresponding in number with the number of horizontal strands of the fence. The wire pickets P pass from the picket-forming part of the machine into the longitudinal grooves 85 of the cross-bars of the traveling bed and between the strand-wires, as shown particularly in Fig. 11. The strand-wire W' passes into the machine from a suitable reel (not necessary to be shown) over rollers 2 and 16 and under rollers 17 and over sheave-wheel 7 into the cross-groove 84, under a frame 8, for holding it in its groove. Sufficient tension is placed on said strand-wire to prevent it from tangling up, and so it will be certain to pass into the cross-grooves in the cross-bars of the traveling bed and so it may be maintained above the fellow strand-wire W² in order that the wire pickets may pass in between them, as shown in Figs. 11 and 23 more particularly. The lower strand-wire W² enters the machine from a reel (not necessary to be shown) over suitable cross-rollers 125 and 125', and from them to the endless traveling bed 3 into the cross-grooves 84 of its cross-bars, as shown in Figs. 3, 4, and 11, and the tension on said wire maintains it in the lower part of said groove, as shown more particularly in Fig. 11, so as to hold said strand-wire below and apart from its fellow strand-wire for the purpose stated. The said traveling bed travels intermittently, so it will stop while the operation of twisting the strand-wires is being performed, and is so driven intermittently by means of power applied to drive pulley 50 through the medium of shaft 37, pinion 36 on said shaft, shaft 39, pinions 38 and 44'' on said shaft, gear-wheel 34 on shaft 35, bevel-gear 32 on shaft 35, shaft 30 and bevel-gear 31 and gear-wheel 23 on said shaft, shaft 24 and gear-wheel 22, wheel 20 on the inner end of shaft 24, notched wheel 19 on the inner end of shaft 89, (see Fig. 4,) pinion 88 on said shaft 89, and gear-wheel 18 on shaft 5, which carries the inner end of said endless carrier. In Fig. 2 the gear-wheel 18 (shown in Fig. 1) is directly behind cam-wheel 77, and hence is not visible in said figure. The intermittent movement is imparted to the traveling bed by means of the wheels 19 and 20. The wheel 20, which is the drive-wheel, has a wrist that acts in the notches of the wheel 19 and turns the latter the distance of one notch at every revolution of wheel 20.

The wheel 20 serves as a lock to wheel 19 by fitting into the hollows cut in its circumference between its notches, so that wheel 20 rotates continuously and turns wheel 19 one notch only at each revolution of wheel 20 for the purpose of stopping the endless traveling bed 3 while the operation of twisting the strand-wires together is going on.

Figure 7:
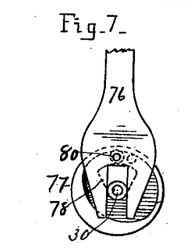
Fig. 7 is a detail side view of one of the arms for supporting the cross-head carrying the strand-wire twisters, showing the cam mechanism for vertically moving said cross-head.
Figures 8, 9:
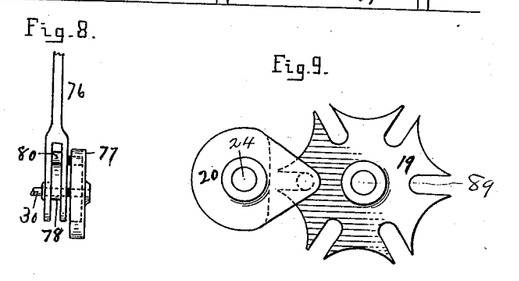
Fig. 8 is a detail face view of said arm and cam.
Fig. 9 is a detail side view of the gears for driving the endless traveling bed intermittently.
Figure 10:
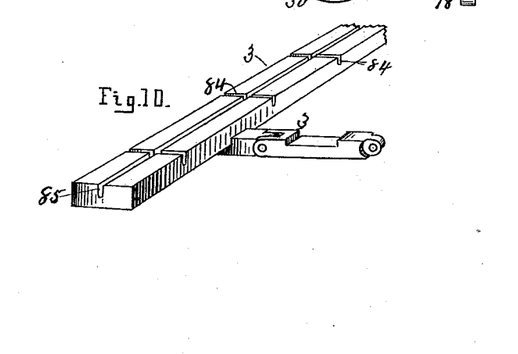
Fig. 10 is a detail perspective view of one of the channeled cross-bars of the endless traveling bed for holding in its channels or grooves the strand-wires and a cross-wire picket.
Figure 28:
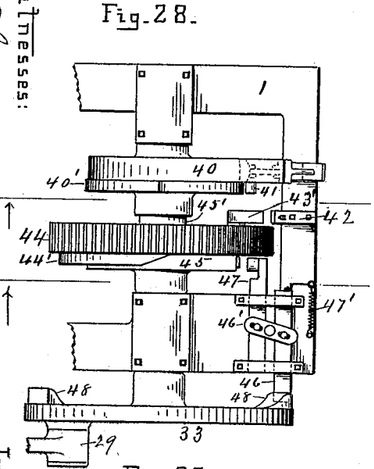
Fig. 28 is a top plan view of the mechanism for reciprocating the toothed rack of the twister-pinions.
Figures 29, 31, 32, 33, 34:
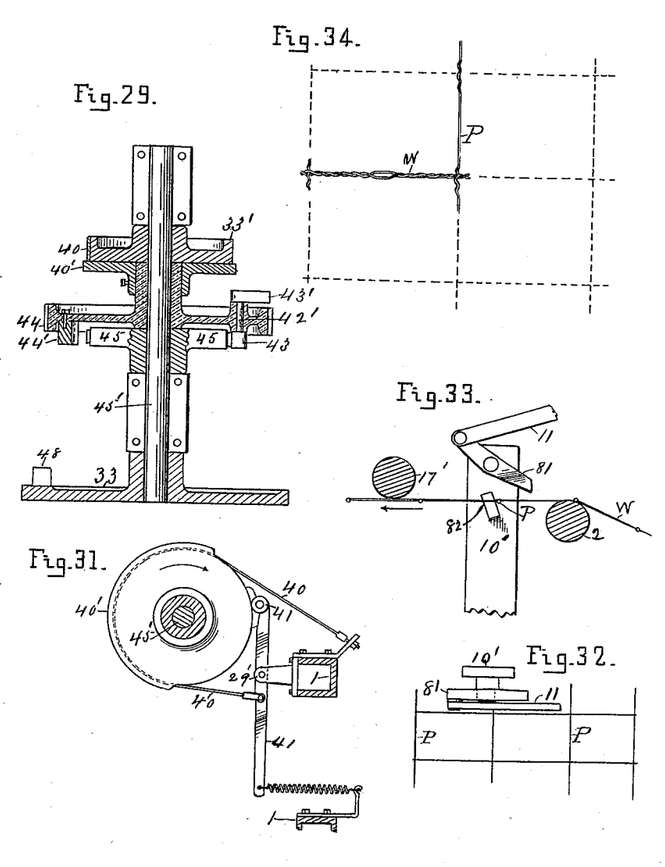
Fig. 29 is a horizontal central section of Fig. 28, omitting the frame.
Fig. 31 is a cross-sectional view of Fig. 28, taken on line 6, looking in the direction of the arrow.
Fig. 32 is a plan view of the shearing mechanism for cutting off the extending ends of the wire pickets after the fence is made.
Fig. 33 is a side view of said wire-picket-cutting mechanism shown in Fig. 32.
Fig. 34 is a view of a portion of the finished wire fence, it being the product of the machine.
Figure 30:
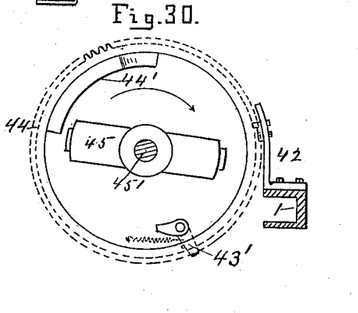
Fig. 30 is a cross-sectional view of Fig. 28, taken on line 5, looking in the direction of the arrow.

A cross beam or head 9 is located above and across the top of the machine, as shown in Figs. 1, 2, 3, and 4. The ends of said cross-head are formed so as to engage with and slide vertically on guide-posts 10 and is supported at each end by means of the depending arms 76. Said arms are recessed at their lower ends and fitted with friction-rollers 80 in their recesses, which rollers respectively rest on cams 78, secured on shaft 30. The lower ends of said arms are also forked transversely to said recesses, so as to fork over said shaft 30 to hold said arms in place on said shaft and permit them to be vertically reciprocated by means of cams 78, as shown in Figs. 7 and 8. A roller 80 is arranged in the lower part of said arms to rest and ride on said cams, which serves to elevate and lower said cross-head as said cams and their shaft rotate. 77 are a pair of cam-wheels fixed on shaft 30, one next the outer sides, respectively, of said arms for bringing the said cross-head down. The lower ends of said arms and their operating-cams are shown in detail in Figs. 7 and 8. Such vertically-reciprocating movement of the said cross-head 9 is necessary to elevate and lower the strand-wire twisters, so that after the twisters have descended and done their work they may be elevated off the strand-wires in order to permit the endless traveling bed to move along and stop, so the twisters may again descend upon them and twist them together in the opposite direction from the last twist. The shaft 30, supporting said cross-head and carrying said cams, is driven continuously by means of the bevel-gears 31 and 32. The said cross-head is provided with a reciprocating toothed rack-bar 100, (shown in Figs. 2, 3, 19, 20, and 27,) arranged in suitable boxes at each end and connected at its inner end by means of the connecting-rod 29 with the crank-wheel 33, by means of which said rack-bar is driven. The outer end of said connecting-rod is connected to a cross-head 114, which moves in the ways 28. (See Figs. 1 and 2.) Said cross-head passes through a vertical slot 102 in the inner end of said rack-bar, as shown in Figs. 2 and 25, so that said rack-bar may have vertical movement with the cross-head 9, which carries it, while said cross-head may move in the same horizontal plane as its ways 28. Said rack-bar meshes with a train of strand-wire pinions 106, the shafts 107 of which are journaled in proper boxes and held in place by means of the face-plates 103. Said shafts 107 have also secured on them the gear-wheels 105, which mesh with a series of twister-pinions 108, arranged immediately below said gear-wheels 105, and are journaled in proper boxes in the plates 103 and 105'. Said twister-pinions are shown in detail in Figs. 21 and 22, and are shown as having a recess 112, extending from its center to its periphery to permit them to fork down over the two strand-wires W' W² between the cross-bars of the endless carrier, as shown in Fig. 24 more particularly. The boxes holding said twister-pinions are formed with corresponding recesses, as shown in Figs. 19 and 20. The machine is so timed that when the endless traveling bed 3 stops the twister-pinions will descend and stride the strand-wires, as shown in Fig. 24, when movement of said rack-bar in either direction will cause the said twister-pinions to turn and twist the two strand-wires together, as shown in Figs. 23, 24, and 34, and after having done their work be elevated by means of their said connection with said cross-head in order that the endless bed may move forward and stop again for another like operation. Said traveling bed must stand still while the wire-twisting operation is going on. The mechanism for operating said rack-bar intermittently for operating the coiling-pinions is shown in Figs. 2, 28, 29, 30, and 31. The crank-wheel 33, to which pitman 29 attaches, is secured on the end of shaft 45', and a brake-wheel 33' is secured on said shaft near its opposite end. A large gear-wheel 44, having an elongated hub, is loose on said shaft, and said hub has secured on it a cam-wheel 40'. A driver-arm 45 is secured on said shaft close at the side of said gear-wheel 44. Said gear-wheel 44 is provided near its periphery with a short cross-shaft 42', having a dog 43 secured on one end, and a trip-arm 43' secured on its opposite end, said arm being held against a stop by means of a coil-spring, as shown in Fig. 30. A cam 44' is attached to the side of gear-wheel 44. The back of the crank-wheel 33 has a pair of opposite lugs 48, as shown in Fig. 28. 46 and 47 are a pair of slides connected by means of a cross-arm 46', pivoted at its center, so that said slides will move in opposite directions. Said gear-wheel 44 is driven by the pinion 44'' on shaft 39 (shown in Fig. 2) in the direction of the arrow in Fig. 30. In its rotation the dog 43 will engage the extending end of arm 45 and cause it and its shaft to rotate until the dog is tripped by means of the trip-arm 43', engaging a stop 42. While the said arm and shaft are rotating the cam 44' is in contact with the outer end of slide 47, which, through its connection with slide 46, holds it withdrawn from contact with the lugs 48 of wheel 33, so said wheel can turn and make a one-half revolution and then stop by means of one of its lugs 48 coming in contact with slide 46, as shown in Fig. 28, which is permitted by the form of cam 44'. The parts are so timed that the instant the dog 43 is tripped to release the arm 45 said slide 46 will be moved by means of cam 44' out so as to engage one of lugs 48 and stop wheel 33. When the shaft 45' rotates, it is necessary that the brake shall be relieved, so said shaft may turn freely. The brake-strap 40 has one end attached to the frame 1 and its opposite end pivotally connected to a lever 41, pivotally connected to the frame 1 at about its center, as shown in Fig. 31. The upper end of said lever is provided with a shoe 41, that is in contact with cam 40', and is maintained in such contact by means of a coil-spring connecting the outer end of said lever with the main frame 1.

The brake-strap 40 has its pressure on the brake-wheel 33', controlled by means of cam 40' through the medium of said lever, and the form of said cam is such that it will cause said brake to be relieved when shaft 45' rotates and be instantly applied when said shaft stops its rotation, so that said shaft 45' and the crank-wheel 33 are turned intermittently one-half revolution each time in order to move the rack-bar 100 in either direction the proper distance.

It is necessary to turn the twister-pinions 108 slightly backward after they have performed the operation of twisting the two strand-wires together, so they may not be held attached to the strand-wires by their backward twist at the time it is necessary to move them up out of contact with the strand-wires, so they may be moved along for the next twist. This is accomplished by means of setting the lugs 48 on the back of the crank-wheel 33 tangentially to a horizontal line drawn through the center of said crank-wheel, so that when said crank-wheel stops it will have carried the wrist of the pitman far enough beyond said horizontal line to have caused the rack-bar 100 to start backward and stop, so as to cause the said twister-pinions to turn slightly backward for the purpose specified and stop, as shown in Fig. 25.

Figures 12, 13, 14, 15, 16, 17, 18:
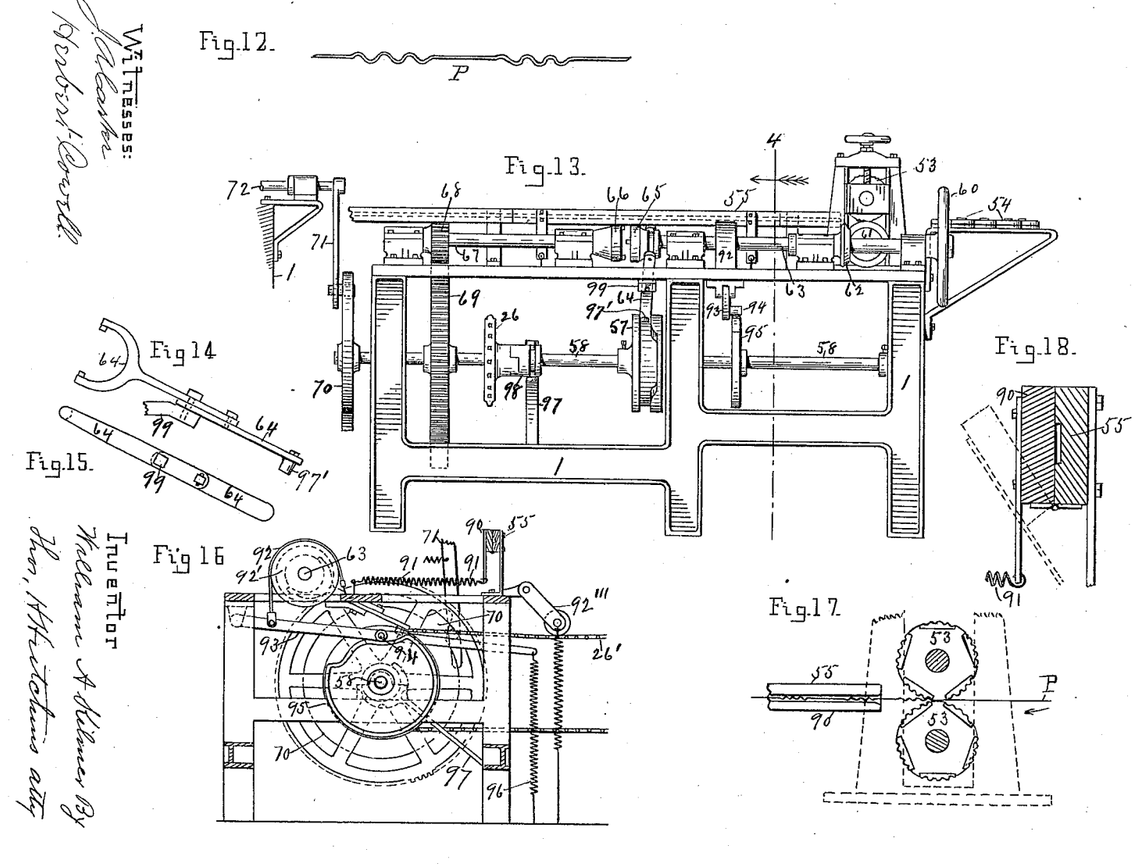
Fig. 12 is a view of a portion of one of the wire pickets formed by the picket-forming portion of the machine.
Fig. 13 is a side elevation of the picket-forming portion of the machine, a plan of which is shown at the lower right hand in Fig. 1.
Figs 14 and 15 are detail views of the forked lever of the clutch mechanism of the picket-forming portion of the machine.
Fig. 16 is a vertical cross-section of Fig. 13, taken on line 4, looking in the direction of the arrow.
Fig. 17 is an end view of rolls for feeding in and crimping the wire pickets, and also a view of a portion of the picket-guide.
Fig. 18 is a cross-sectional view of the picket-guide, showing it made in two parts hinged together.

The pickets used are made of wire and formed as shown in Fig. 12.

Figure 1:
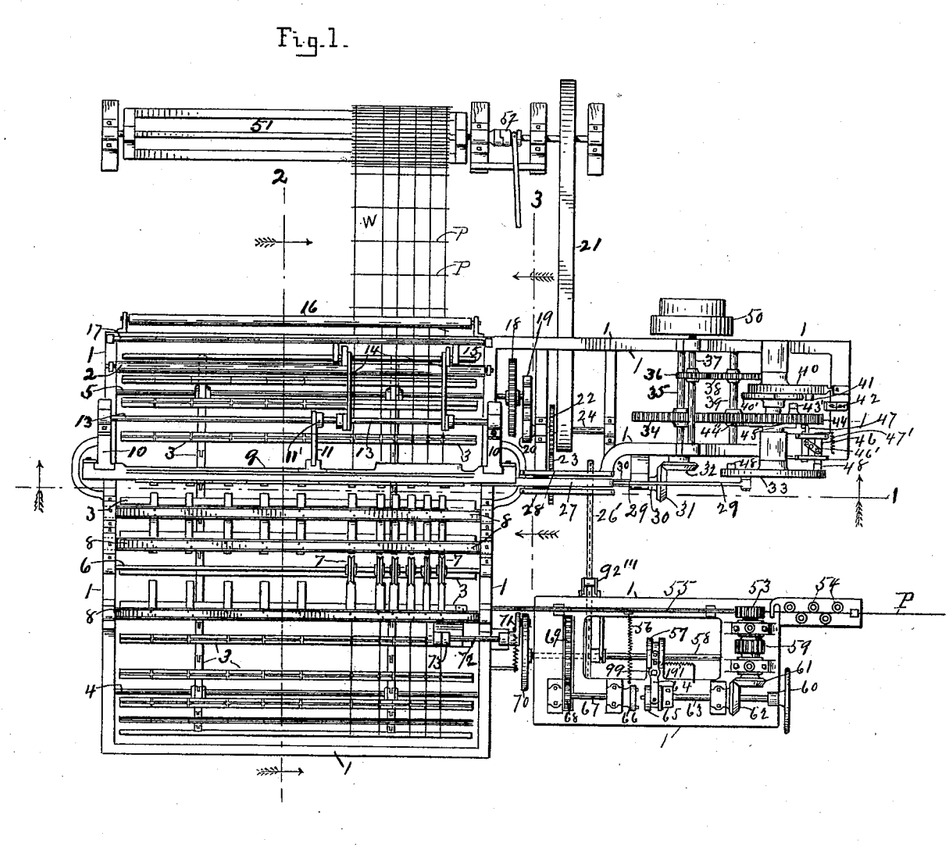
Figure 1 is a top plan view.

The parts of the machine for feeding in and crimping the pickets P are shown in Figs. 1 and 13, and in 16 and 17 more particularly. In said figures, 53 represents a pair of feed and crimping rolls having their faces crimped and plain, alternately, as shown more particularly in Fig. 17, so that when the picket-wire passes between them it is crimped between its plain portions, as shown more particularly in Fig. 12, the crimps serving to prevent the picket from falling down from between the strand-wires. The shafts of the feed-rolls are connected by means of pinions 59, Fig. 1. The lower feed-roll shaft has secured on its end opposite its feed-roll the bevel-gear 61, which meshes with bevel-gear 62, secured on shaft 63. The outer end of shaft 63 is provided with a hand-wheel 60, and its inner end has attached to it by means of a spline the clutch 65, which is moved on its shaft, so as to connect it with the clutch 66, secured on shaft 67. The feed-rolls are driven intermittently to feed in one picket length at a time, which intermittent movement is obtained by connecting and disconnecting said clutch mechanism, which is done by the lever 64, which forks over clutch 65 and is pivotally connected to the frame of the machine through the medium of an arm 99. The opposite end of said lever is provided with a roller-wrist 97', which works in the channel of cam-wheel 57, secured on shaft 58. Said shaft 58 has placed loosely on it a sprocket-wheel 26, a gear-wheel 69 for meshing with pinion 68, secured on shaft 67, a cam-wheel 70 on its outer end, and a cam-wheel 95. The shaft 58 is driven continuously by a sprocket-chain 26', connecting said sprocket-wheel 26 with a similar sprocket-wheel on shaft 30, as shown in Fig. 1. An antifriction gravity-roller 92''' (shown in Figs. 1 and 16) rests on sprocket-chain 26' and serves to take up any slack there may be in said chain and prevent it from running off its sprocket-wheels. When it is desired to stop shaft 58, the clutch 98, which is splined on said shaft, is moved out of contact with sprocket-wheel 26 by means of a lever 97, which forks over said clutch. Shaft 63 has secured on it a friction-wheel 92', (shown in Fig. 16,) over which passes a friction-strap 92, one end of which friction-strap is secured to the frame 1, and its opposite end is attached to a lever 93. Said lever is provided with a roller-wrist 94, which rests on the cam 95 and is held in such contact by means of a coil-spring 96, connecting its outer end with the floor, as shown in Fig. 16. The form of such cam causes the said friction-strap to be loosened at the time it is necessary for the feed-rolls 53 to operate and causes said brake to be applied and stop rotation of shaft 63 instantly when the clutches 65 and 66 are separated and shaft 67 ceases to drive shaft 63. When power is applied to the sprocket-wheel 26, the shaft 58 will be driven continuously, and as said shaft is connected with shaft 67 by means of the gear-wheel 69 and pinions 68 said shaft 67 will be driven continuously and shaft 63 and the feed-roll mechanism will be driven intermittently by means of the said clutch mechanism and its cam-and-lever mechanism. The form of cam 57 is such that it will operate the clutch mechanism to start and turn the feed-rolls at the time it is necessary to feed in a picket and stop the said rolls at the time the picket is fed in. It will be observed that the channel of cam-wheel 57 is straight on one side, as shown in Fig. 13. This cam-channel is so formed for the purpose of preventing the lever 64 from operating the clutch 65, when desired, by detaching its outer end from the coil-spring 191, (shown in Fig. 1,) as it requires the action of said spring to throw said lever over against the cam-surface of said cam-channel.

90 55 is a guide for conducting pickets from the feed-rolls to the endless traveling bed 3.

54 are a set of wire-straightening rolls, through which the wire for making pickets passes to the feed-rolls. Said wire-guide is made in two parts, the part 90 being hinged to the part 55, as shown in Figs. 13 and 18. The two parts are held closed together by means of coil-springs 91, attached to the extending end of an arm attached to the part 90. By means of such hinged connection the guide may be opened to remove a wire that has become crimped up and fast in the guide.

After a wire picket has been fed into the machine in one of the longitudinal grooves of the cross-bars of the endless traveling bed it is necessary to sever it from the next succeeding wire picket. For this purpose the machine is provided with a pair of cutting-dies, between which the wire picket passes. This cutting-off mechanism is shown in Figs. 1, 5, 6, and 13. 83 represents a movable die arranged to shear with a stationary die 84' and so arranged as to be in line with the picket-wire and so it can pass between them from the wire-guide. The movable die is pivotally connected with a crank-arm 73, secured on the end of rock-shaft 72. Said shaft has connected to its opposite end the lever 71, having a roller-wrist that is held in contact with the face of the cam-wheel 70, secured on the end of shaft 58. (See also Fig. 16.) As said cam-wheel 70 rotates it will, through its said connection with the cutting-die 83, cause it to reciprocate, and it is so timed that it will move forward to shear with the stationary die 84' and sever the wire picket from the next succeeding picket, so as to permit the endless bed 3 to start and move forward, so the next succeeding picket may be fed in in a similar manner.

It is necessary to cut off the outer extending ends of the pickets after the coiling together of the strand-wires has been completed, so as to hold the wire pickets in their proper place. This is done by means of a shear and die mechanism (shown in detail in Fig. 33 and also partially shown in Figs. 1, 2, and 4) to locate the parts. The shear 81 is pivotally connected at about its center to a post 10'. Its upper end is connected with the cross-head 9, through the medium of a bell-crank 11' and the link 11. The vertical movement of said cross-head will cause said shear to cut with a stationary die 82, secured to said post in line with the passing finished fence and in such manner that the picket ends to be cut off will engage said stationary die at the proper time to be cut off by said shear 81, thus leaving the extending picket ends all of uniform length and give the fence a finished appearance.

The hubs of the coiling-pinions 108 are bored out on the forward end of the pinion, so that a wearing-plate 113 (shown in Figs. 21 and 22) may be secured in said bore by means of screws, so that a new plate may be inserted when one is worn out. It is necessary that the coiling-pinions shall have some end movement, so they can move a trifle with the strand-wires before entirely disengaged from them while the strand-wires are being twisted. This is accomplished by making the pinion a little less in thickness than the width of the box in which it is placed, as shown in Fig. 19. In order to return the coiling-pinion to its first position as to its horizontal movement, a plate 111 is placed behind it on a stud 109, carrying a coil-spring 110, which spring presses said plate against said coiling-pinion, as shown, for the purpose specified.

In operation the upper strand-wire W' and lower strand-wire W² pass into the machine into the cross-grooves 84 of the cross-bars of the endless traveling bed 3, as stated heretofore and as shown in Figs. 3, 4, and 11. Any number of strand-wires necessary to make a fence of any desired height may be so placed in the machine, the cross-grooves in the cross-bars of the traveling bed corresponding with the number of strands of the fence. The traveling bed is then caused to move intermittently, the wire pickets having been fed in, as before stated, in the groove 85 of the cross-bars of the endless bed 3, a picket being fed in while the said bed is at rest. The traveling bed stops each time in a position which permits the coiling-pinions to descend upon the strand-wires between each cross-bar of the traveling bed, pickets having been previously fed in between the strand-wires, as already stated. The machine is so timed that the coiling-pinions will then rotate and twist the two strand-wires together and then move up off the strand-wires to descend again between the next succeeding cross-bars of the traveling bed, but in the opposite direction, because the coiling-pinions are driven in opposite directions by the reciprocating rack-bar. The finished fence passes over the roller 2' and under roller 17' and is wound up on reel 51 as it passes from the machine, the reel being driven from shaft 24 by means of belt 21, which is loose enough on its pulleys so it may slip when the reel stops while the coiling operation is going on.

Having thus described my invention, what I claim as new, and desire to secure by Letters Patent, is as follows, to wit:

1. In the machine shown and described for making mesh-wire fence, the combination of the endless traveling bed formed of endless sprocket-chains, and cross-bars provided with longitudinal and cross grooves for the reception of the strand-wires and picket-wires, the means for supporting and intermittently driving said endless traveling bed, the means for feeding the strand-wires and picket-wires to their respective grooves in said cross-bars of said traveling bed, and the means for severing the picket-wires after being fed to the traveling bed, all arranged to operate substantially as and for the purpose set forth.

2. In the machine shown and described for making mesh-fence, the combination of the endless traveling bed formed with grooves for the reception of the strand-wires and picket-wires, the frame for holding said wires in their respective grooves, the means for supporting, and for intermittently driving said traveling bed, and the means for alternately twisting the strand-wires together in opposite directions between the picket-wires substantially as and for the purpose set forth.

3. In the machine shown and described for making mesh-wire fence, the combination of a pair of feed-rolls having their peripheries alternately plain and crimped for feeding forward and crimping the picket-wires, the means for intermittently driving said rolls, the guide for conducting the picket-wire to the endless traveling bed, the shear mechanism for severing the wire pickets from each other, and the means for operating said shear mechanism, all arranged to operate substantially as and for the purpose set forth.

4. In the machine shown and described for making mesh-wire fence, the combination of the endless traveling bed having grooves for holding the strand-wires, one a short distance above the other, and for holding the picket-wires so they may feed forward between the strand-wires, the means for intermittently driving said traveling bed, the series of coiling-pinions for twisting the strand-wires together in opposite directions alternately between the picket-wires, the means for elevating and lowering and for driving said coiling-pinions and for turning them slightly backward to release them from the twisted strand-wires all arranged to operate substantially as and for the purpose set forth.

5. In the machine shown and described for making mesh-wire fence, the combination of the cross-head 9, the means for elevating and lowering said cross-head, the rack-bar 100, the means for reciprocating said rack-bar, pinions 105 and 106 and their shaft 107, coiling-pinion 108 having its forward journal recessed, the detachable wearing-plate 113 seated in said recess, spring-plate 111 yieldingly bearing against the rear journal of said coiling-pinion, stud 109, coil-spring 110 carried on said stud and bearing against plate 111, and plates 103, 104, 105' for holding said pinions in place all arranged to operate substantially as and for the purpose set forth.

6. In the machine shown and described for making mesh-wire fence, the combination of the coiling-pinion 108 having a hollow forward journal, and having a radial slot 112 extending from its forward hollow journal rearward through its rear journal, the wearing-plate 113 having a radial slot having parallel sides corresponding with the radial slot in said pinion, and seated in said hollow journal, and the screws for detachably securing said plate in said hollow journal all arranged to operate substantially as and for the purpose set forth.

7. In the machine shown and described for making mesh-wire fence the combination with the cross-head 9, the coiling-pinion 108, the spring-plate 111 bearing yieldingly against the rear part of said pinion, and the means for driving said coiling-pinion all arranged to operate substantially as and for the purpose set forth.

8. In the machine shown and described for making mesh-wire fence the combination of the intermittently-driven rolls 53, 53 having their faces provided with alternate plain and crimped portions, the wire-guide 90, 55, the stationary cutting-die 84', the movable cutting-die 83 and the means for operating said movable die all arranged to operate substantially as and for the purpose set forth.

9. In the machine described for making mesh-wire fence, the combination of shaft 45', crank-wheel 33 fast on said shaft and having the lugs 48, the slides 46 and 47, cross-bar 46' for connecting said slides, gear-wheel 44 loose on said shaft, the cam 44' secured to said gear-wheel, the short cross-shaft 42' journaled in said gear-wheel near its periphery, the dog 43 and trip-arm 43' secured respectively one on each end of said cross-shaft, the drive-arm 45 secured to shaft 45' and adapted to be engaged and intermittently rotated by said dog, the cam-wheel 40' secured on the hub of gear-wheel 44, the brake-wheel 33' secured on shaft 45', brake-strap 40 for engaging said brake-wheel, lever 41 having a brake-shoe for bearing against the cam-wheel 40' and connected with said brake-strap, the trip 42, pitman 29, twister-pinions 108 and rack-bar 100, all arranged to operate substantially as and for the purpose set forth.

10. In the machine shown and described for making mesh-wire fence, the combination of a pair of feed-rolls having their peripheries alternately plain and crimped for feeding forward and crimping the picket-wire, means for conducting the picket-wire in place between the strand-wires, the shear mechanism for severing the wire pickets from each other, and the means for operating the shear mechanism substantially as and for the purpose set forth.

11. In the machine shown and described for making mesh-wire fence, the combination of the means for feeding forward the picket-wire, the means for guiding the picket-wires between the strand-wires, the means for severing the picket-wires from each other, and the means for operating said shearing mechanism all arranged to operate substantially as and for the purpose set forth.

12. In the machine shown and described for making mesh-wire fence, the combination of the means for intermittently driving the coiling-pinions, the means for releasing the coiling-pinions from the twisted strand-wires, and the means for operating the coiling-pinions, all arranged to operate substantially as and for the purpose set forth.

13. In the machine shown and described for making mesh-wire fence, the combination of a rack-bar, means for reciprocating said rack-bar, coiling-pinions in mesh with said rack-bar and having their forward journal recessed and a wearing-plate seated therein, means for yieldingly holding said coiling-pinions forward, and means for elevating and lowering said coiling-pinions and rack-bar substantially as and for the purpose set forth.

14. In the machine shown and described for making mesh-wire fence, the combination of the means for conveying the strand-wires and picket-wires in place to be twisted together, the means for holding the strand-wires and picket-wires during the twisting operation, the means for intermittently conducting the strand-wires and picket-wires forward after the twisting operation, the means for twisting the strand-wires together between the picket-wires, and the means for elevating and lowering the coiling-pinions substantially as and for the purpose set forth.

15. In the machine shown and described for making mesh-wire fence, the combination of the coiling-pinion having a hollow forward journal, and having a radial slot extending from its hollow journal through its rear journal, the wearing-plate seated in said hollow journal, and having a corresponding radial slot to that of said pinion, the means for detachably securing said plate in said hollow pinion, and the spring for yieldingly bearing against the rear of said pinion in such manner as to permit an end movement of said pinion all arranged to operate substantially as and for the purpose set forth.

16. In the machine shown and described for making mesh-wire fence, the combination of the means for intermittently driving the picket-rolls, the means for guiding the wire pickets to and between the strand-wires, and the means for cutting the picket-wire into picket lengths substantially as and for the purpose set forth.

WILLIAM A. KILMER.

Witnesses:
 THOS. H. HUTCHINS,
 HERBERT COWELL.